US008344852B2

(12) United States Patent
Roth

(10) Patent No.: US 8,344,852 B2
(45) Date of Patent: Jan. 1, 2013

(54) METHOD AND SYSTEM FOR TRANSMITTING A PLURALITY OF NOTIFICATIONS IN A NOTIFICATION POOL

(75) Inventor: Joshua Roth, Pacific Palisades, CA (US)

(73) Assignee: Blackboard Connect Inc., Washington, DC (US)

( * ) Notice: Subject to any disclaimer, the term of this patent is extended or adjusted under 35 U.S.C. 154(b) by 651 days.

(21) Appl. No.: 12/480,535

(22) Filed: Jun. 8, 2009

(65) Prior Publication Data

US 2010/0156631 A1 Jun. 24, 2010

Related U.S. Application Data

(60) Provisional application No. 61/140,814, filed on Dec. 24, 2008.

(51) Int. Cl.
*H04Q 1/30* (2006.01)

(52) U.S. Cl. .......... 340/7.2; 340/7.1; 340/506; 340/531; 455/426.1

(58) Field of Classification Search .................. 340/7.2, 340/7.1, 506, 540, 531; 455/426.1; 380/241; 715/715
See application file for complete search history.

(56) References Cited

U.S. PATENT DOCUMENTS

| | | | | |
|---|---|---|---|---|
| 6,211,782 | B1 * | 4/2001 | Sandelman et al. | 340/506 |
| 6,496,693 | B1 * | 12/2002 | Tran | 455/426.1 |
| 2007/0096894 | A1 * | 5/2007 | Lemmon | 340/506 |
| 2007/0150631 | A1 * | 6/2007 | Druke et al. | 710/244 |

* cited by examiner

*Primary Examiner* — George Bugg
*Assistant Examiner* — Sisay Yacob
(74) *Attorney, Agent, or Firm* — McDermott Will & Emery LLP

(57) ABSTRACT

A method for transmitting a plurality of notifications in a notification pool includes determining a first notification batch having the plurality of notifications, and assigning a priority weight to each of the plurality of notifications, at least two of the priority weights being different. The method further includes inserting the first notification batch into the notification pool, and transmitting the plurality of notifications in the notification pool sequentially, based on the priority weights of the plurality of notifications. A system for transmitting a plurality of notifications is also provided.

19 Claims, 8 Drawing Sheets

| Type | Priority Multiplier | Age Delta | Age Multiplier |
|---|---|---|---|
| Emergency | 1 | 5 mins | 3 |
| Outreach | 2 | 10 mins | 2 |
| Attendance | 4 | 10 mins | 2 |
| Retry | 6 | 5 mins | 2 |

| Time Entered | Total Calls Remaining | Schedule ID | Type | Call-ID1 | Call-ID2 | Call-ID3 | Call-ID4 | Call-ID5 | Call-ID6 | Call-ID7 | Call-ID8 | Call-ID9 | Call-ID10 |
|---|---|---|---|---|---|---|---|---|---|---|---|---|---|
| 12:00 | 100 | 1002 | Emergency | 1 | 2 | 3 | 4 | 5 | 6 | 7 | 8 | 9 | 10 |
| 12:00 | 100 | 1003 | Outreach | 2 | 4 | 6 | 8 | 10 | 12 | 14 | 16 | 18 | 20 |
| 12:00 | 100 | 1004 | Attendance | 4 | 8 | 12 | 16 | 20 | 24 | 28 | 32 | 36 | 40 |
| 12:00 | 100 | 1005 | Retry | 6 | 12 | 18 | 24 | 30 | 36 | 42 | 48 | 54 | 60 |

| Call-ID11 | Call-ID12 | Call-ID13 | Call-ID14 | Call-ID15 | Call-ID16 | Call-ID17 | Call-ID18 | Call-ID19 | Call-ID20 | ... | Call-IDFinal |
|---|---|---|---|---|---|---|---|---|---|---|---|
| 11 | 12 | 13 | 14 | 15 | 16 | 17 | 18 | 19 | 20 | | 100 |
| 22 | 24 | 26 | 28 | 30 | 32 | 34 | 36 | 38 | 40 | | 200 |
| 44 | 48 | 52 | 56 | 60 | 64 | 68 | 72 | 76 | 80 | | 400 |
| 66 | 72 | 78 | 84 | 90 | 96 | 102 | 108 | 114 | 120 | | 600 |

FIG. 3

The time is 12:03 and calls have been made up to PriorityID 20

A new 10 call Emergency Schedule arrives

| Time Entered | Total Calls Remaining | ScheduleID | Type | Call-ID1 | Call-ID2 | Call-ID3 | Call-ID4 | Call-ID5 | Call-ID6 | Call-ID7 | Call-ID8 | Call-ID9 | Call-ID10 | ... | Call-IDFinal |
|---|---|---|---|---|---|---|---|---|---|---|---|---|---|---|---|
| 12:00 | 0 | 1001 | Demo | SCHEDULE COMPLETED | | | | | | | | | | | |
| 12:00 | 80 | 1002 | Emergency | 21 | 22 | 23 | 24 | 25 | 26 | 27 | 28 | 29 | 30 | | 100 |
| 12:00 | 90 | 1003 | Outreach | 22 | 24 | 26 | 28 | 30 | 32 | 34 | 36 | 38 | 40 | | 200 |
| 12:00 | 95 | 1004 | Attendance | 24 | 28 | 32 | 36 | 40 | 44 | 48 | 52 | 56 | 60 | | 400 |
| 12:00 | 97 | 1005 | Retry | 26 | 32 | 38 | 44 | 50 | 56 | 62 | 68 | 74 | 80 | | 600 |
| 12:03 | 10 | 1006 | Emergency | 21 | 22 | 23 | 24 | 25 | 26 | 27 | 28 | 29 | 30 | | 30 |

FIG. 4

The time is 12:15 and calls have been made up to PriorityID 50

A new 20 call Attendance Schedule arrives

| Time Entered | Total Calls Remaining | Schedule ID | Type | Call-ID1 | Call-ID2 | Call-ID3 | Call-ID4 | Call-ID5 | Call-ID6 | Call-ID7 | Call-ID8 | Call-ID9 | Call-ID10 | Call-IDFinal |
|---|---|---|---|---|---|---|---|---|---|---|---|---|---|---|
| 12:00 | 50 | 1002 | Emergency | 51 | 52 | 53 | 54 | 55 | 56 | 57 | 58 | 59 | 60 | 100 |
| 12:00 | 75 | 1003 | Outreach | 52 | 54 | 56 | 58 | 60 | 62 | 64 | 66 | 68 | 70 | 200 |
| 12:00 | 88 | 1004 | Attendance | 54 | 58 | 62 | 66 | 70 | 74 | 78 | 82 | 86 | 90 | 400 |
| 12:00 | 92 | 1005 | Retry | 56 | 62 | 68 | 74 | 80 | 86 | 92 | 98 | 104 | 110 | 600 |
| 12:00 | 0 | 1006 | Emergency | SCHEDULE COMPLETED | | | | | | | | | | |
| 12:15 | 20 | 1007 | Attendance | 54 | 62 | 70 | 78 | 86 | 94 | 102 | 110 | 118 | 126 | 214 |

FIG. 5

The time is 12:17 and calls have been placed up to PriorityID 400

| Time Entered | Total Calls Remaing | Schedule ID | Type | Call-ID1 | Call-ID2 | Call-ID3 | Call-ID4 | Call-ID5 | Call-ID6 | Call-ID7 | Call-ID8 | Call-ID9 | Call-ID10 | ... | Call-IDFinal |
|---|---|---|---|---|---|---|---|---|---|---|---|---|---|---|---|
| 12:00 | 0 | 1002 | Emergency | SCHEDULE COMPLETED | | | | | | | | | | | |
| 12:00 | 0 | 1003 | Outreach | SCHEDULE COMPLETED | | | | | | | | | | | |
| 12:00 | 0 | 1004 | Attendance | SCHEDULE COMPLETED | | | | | | | | | | | |
| 12:00 | 32 | 1005 | Retry | 406 | 412 | 418 | 424 | 430 | 436 | 442 | 448 | 454 | 460 | | 600 |
| 12:03 | 0 | 1006 | Emergency | SCHEDULE COMPLETED | | | | | | | | | | | |
| 12:15 | 0 | 1007 | Attendance | SCHEDULE COMPLETED | | | | | | | | | | | |

FIG. 6

The time is 12:17

A new 10 call attendance schedule arrives

Since there are no currently waiting Attendance Schedules there is no time multiplier

| Time Entered | Total Calls Remaing | Schedule ID | Type | Call-ID1 | Call-ID2 | Call-ID3 | Call-ID4 | Call-ID5 | Call-ID6 | Call-ID7 | Call-ID8 | Call-ID9 | Call-ID10 | ... | Call-IDFinal |
|---|---|---|---|---|---|---|---|---|---|---|---|---|---|---|---|
| 12:00 | 32 | 1005 | Retry | 406 | 412 | 418 | 424 | 430 | 436 | 442 | 448 | 454 | 460 | | 600 |
| 12:17 | 20 | 1008 | Attendance | 406 | 410 | 414 | 418 | 422 | 426 | 430 | 434 | 438 | 442 | | 486 |

FIG. 7

METHOD AND SYSTEM FOR TRANSMITTING A PLURALITY OF NOTIFICATIONS IN A NOTIFICATION POOL

CROSS-REFERENCE TO RELATED APPLICATIONS

This application claims priority to U.S. Provisional Patent App. No. 61/140,814, filed on Dec. 24, 2008, the entire contents of which are herein incorporated by reference.

BACKGROUND

1. Field

The present disclosure relates to transmission of notifications, and more particularly, to methods and systems for transmitting a plurality of notifications in a notification pool.

2. Background

Businesses and governmental entities, including municipalities and schools, are ever more reliant on communicating through the mass transmission of notifications to their staff, citizens and family members of students to keep these constituencies apprized of important events, and sometimes of emergencies. For example, a school principal might need to inform the parent of every child that the school will be closed the next day due to some unforeseen event such as flooding, fire, or freezing conditions. Such notifications might be sent to telephones, facsimiles, pagers, electronic mail (e-mail), and/or text messages. These notifications will typically vary in their degree of importance, in the number of recipients, or in the immediacy with which they must be sent. Regardless of these varying factors, as a practical matter, each notification being transmitted is typically placed in a linear queue by the processing system sending these notifications. The processing system may then send the notifications to a provider who specializes in transmitting them. Such provider may use, for example, a first-in-first-out (FIFO) rule or last-in-first-out (LIFO) to determine the sequence of transmission.

One of the shortcomings found to exist in the system described is that if 10,000 notifications are placed into a queue that is configured for FIFO and then a subsequent batch of 100 notifications is placed into the queue, the 10,000 notifications would all have to be processed from the queue prior to the 100 notifications being processed. But some of the 100 notifications in the later batch may be extremely urgent, whereas many of the 10,000 notifications may be non-urgent. The systems of the prior art may require that all 10,000 notifications issue before any of the 100 notifications, including the urgent notifications within the 100 notifications. This is a disadvantageous outcome.

It has further been found that current mass notification systems may exacerbate problems that the system is put into operation to solve. For example, in an area where telecommunications equipment has been degraded by a cause such as a hurricane or tornado, current transmission systems may overload and flood telecommunications networks and thereby actually prevent the distribution of pertinent information. Moreover, such overloading may have the potential to block necessary agencies (Red Cross, Police, Fire, etc.) from utilizing those telecommunications channels for communicating.

SUMMARY

There is a need for an appropriate sequencing system that can identify the urgent notifications in later batches, and blend them into the earlier batches in a fair way, so that urgent notifications are treated urgently even though they may be placed in the transmission queue for transmission at a later point in time. The same need may apply to notifications of lesser urgency, but which may nevertheless be more urgent than lower priority notifications placed in an earlier batch.

Further, there is a need for an appropriate sequencing system by which the foregoing problems may be mitigated. Embodiments of the disclosed systems and methods address these and other needs.

The present disclosure describes systems and methods whereby a notification to be sent may be created by a user to a mass of recipients who may use various different devices to receive the notification. The disclosed systems and methods provide a form of control over the sequencing of notifications in a large pool of notifications created from various batches of notifications that are awaiting transmission.

In certain aspects of the disclosure, a method for transmitting a plurality of notifications in a notification pool is provided. The method includes determining a first notification batch having the plurality of notifications, and assigning a priority weight to each of the plurality of notifications, at least two of the priority weights being different. The method further includes inserting the first notification batch into the notification pool, and transmitting the plurality of notifications in the notification pool sequentially, based on the priority weights of the plurality of notifications.

In a further aspect of the disclosure, a system for transmitting a plurality of notifications is provided. The system includes a processor configured to determine a first notification batch having the plurality of notifications, and to assign a priority weight to each of the plurality of notifications, at least two of the priority weights being different. The processor is further configured to insert the first notification batch into the notification pool, and to transmit the plurality of notifications in the notification pool sequentially, by selecting for next transmission the notification in the notification pool with the lowest priority weight.

In yet a further aspect of the disclosure, a machine-readable medium encoded with instructions for transmitting a plurality of notifications is provided. The instructions include code for determining a first notification batch having the plurality of notifications, and assigning a priority weight to each of the plurality of notifications, at least two of the priority weights being different. The instructions further include code for inserting the first notification batch into the notification pool, and transmitting the plurality of notifications in the notification pool sequentially, by selecting for next transmission the notification in the notification pool with the lowest priority weight.

The assigning the priority weight to each of the plurality of notifications may be based on a notification class associated with each of the plurality of notifications. The assigning the priority weight may include assigning to each notification in a first notification class a priority weight that increases with each notification by a constant first increment, and assigning to each notification in a second notification class a priority weight that increases with each notification by a constant second increment different than the first increment.

The determining of the first notification batch may occur at a first time, and each notification may be time stamped with the first time. At a second time later than the first time, a second notification batch having a plurality of notifications may be determined. A priority weight may be assigned to each of the plurality of notifications in the second notification batch, wherein a starting priority weight of the first notification of the second notification batch is not less than the lowest priority weight of any notification in the notification pool.

The second notification batch may be inserted into the notification pool for transmission with the other notifications in the notification pool.

The assigning of a priority weight to each of the plurality of notifications in the second notification batch may include assigning to each notification in the second notification batch a priority weight that increases with each notification by a third increment. The size of the constant third increment may be based on a notification class associated with each notification in the second notification batch.

Each notification in the second notification batch may be stamped with the second time. The first time stamp may be subtracted from the second time stamp to obtain a time lag between the first and second notification batches. The size of the third increment may be based upon the time lag.

The notification class may be one of an emergency class, an outreach class, an attendance class, and a retry class, the retry class corresponding to a notification attempt which was previously unsuccessful. The transmitting the plurality of notifications in the notification pool sequentially may include selecting for next transmission the notification in the notification pool with the lowest priority weight. Each of the plurality of notifications may be at least one of an email notification, a telephone notification, a cellular phone notification, a facsimile notification, a text message, and a pager notification.

The determining of the first notification batch may include preparing the first notification batch. In addition, the determining of the first notification batch may include receiving the first notification batch.

In another aspect of the disclosure, a method for transmitting a set of notifications in a notification pool is provided. The method includes determining a first notification batch having at least one notification, and assigning a priority weight to each of the notifications in the first notification batch. The method also includes inserting the first notification batch into the notification pool, and transmitting the notifications in the notification pool sequentially, based on the priority weights of the notifications. In certain aspects of the method, the first notification batch includes a plurality of notifications, and at least two of the priority weights assigned to each of the notifications in the first notification batch are different.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3 is a chart illustrating the transmission of a plurality of notifications in a notification pool.

FIG. 4 is a chart further illustrating the transmission of a plurality of notifications in a notification pool.

FIG. 5 is a chart further illustrating the transmission of a plurality of notifications in a notification pool.

FIG. 6 is a chart further illustrating the transmission of a plurality of notifications in a notification pool.

FIG. 7 is a chart further illustrating the transmission of a plurality of notifications in a notification pool.

DETAILED DESCRIPTION

With reference to the drawings, which are provided by way of exemplification and not limitation, there are disclosed embodiments for disseminating a mass of outgoing digital notifications to a selected group, or groups, of recipients by way of various communication methods. More specifically, the selection of individual notifications from a mass pool of outgoing digital notifications for sequential priority transmission to recipients is disclosed.

Figure 1:
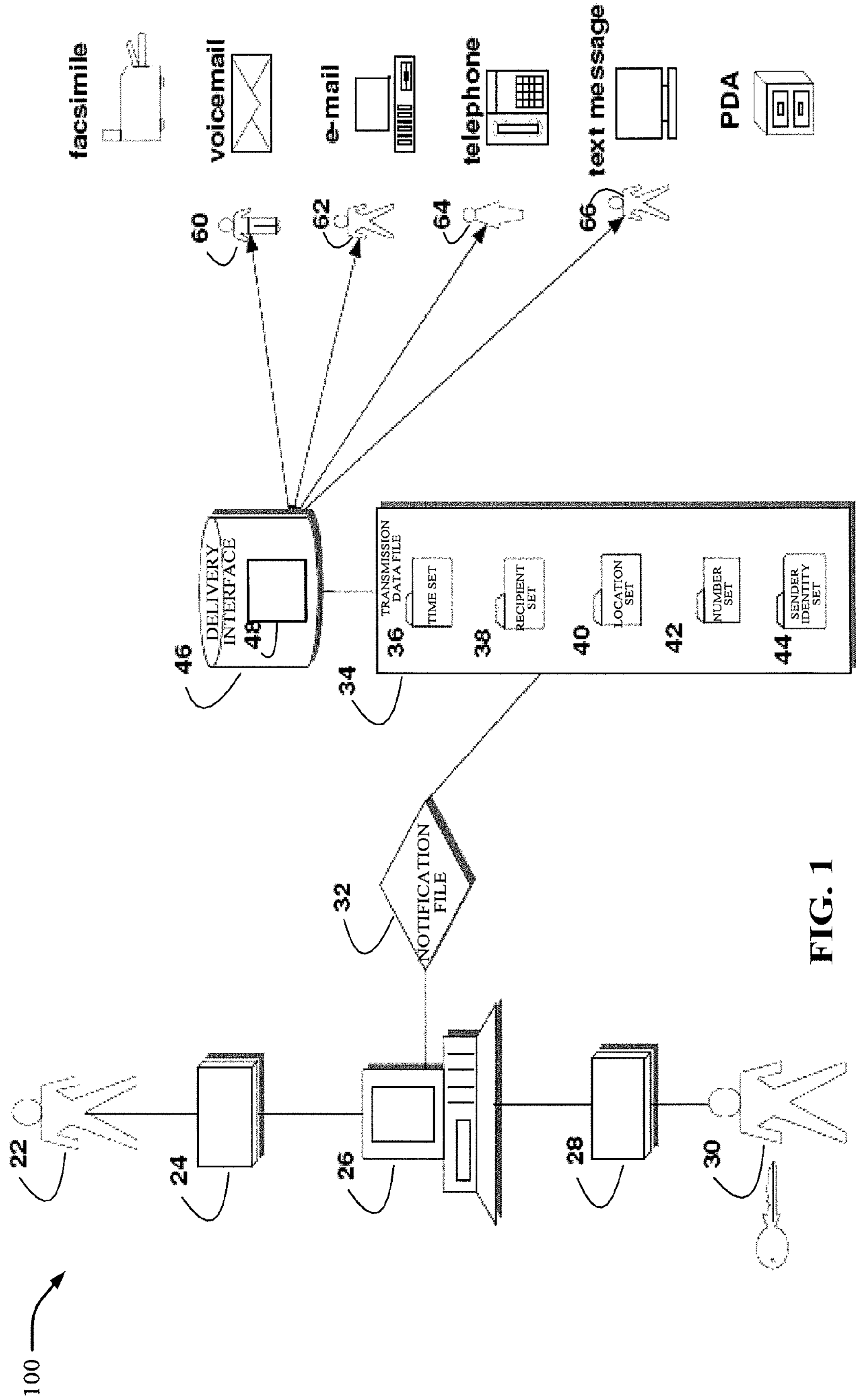
FIG. 1 is a diagram illustrating an example of a mass notification transmission system.

FIG. 1 is a diagram illustrating an example of a mass notification transmission system. As can be seen in FIG. 1, a CPU or central processing unit 26 forms a core component of the system. The CPU 26 is preconfigured to receive a notification from a user 22, or initiator, of the system who may wish to send that notification to a large number of recipients. The user 22 will have normally acquired the right to send a notification into the CPU 26 by earlier entering into a contract with the management of the system, entering his name on a list of legitimate users, paying the required fee if appropriate, and acquiring an entry code. The notification the user 22 sends to the CPU 26 may be sent in any one of a number of different formats via a transmission interface 24. It should be noted that a system administrator 30 may also send a notification via a different transmission interface 28. For example, the transmission interface 24 and/or 28 may be an ordinary land telephone, a cell phone, a computer for sending email, a computer with an internet connection, or it may be a facsimile machine for sending faxes, or the like.

As an example, a notification might be: "Please clear your brush before fire season." The selected recipients might be a group of residents who live within a fire zone. The time and date to send might be tonight at 7:00 pm, and the methods of transmission to recipients selected by the user might include telephone and e-mail delivery. These choices are exemplary only.

Once the notification is received from the user 22 by the CPU 26, it is stored by the CPU 26, in a local or remote memory associated with the CPU 26, as a notification file 32. The notification file 32 may be associated with a transmission data file 34 for later use, as set forth more fully below. Firstly, it may be noted that if the notification received is an ordinary voice notification via an interface 24 which is a telephone, the analogue voice signal may be converted to a digital sound file such as a .wav file and stored by the CPU 26 as such. If the notification received via the interface 24 is an email or a submission to a website, it may be stored by the CPU 26 as a .txt file, but it may also be converted to a sound file using TTS (text-to-speech) software. If the notification is received as facsimile, it may be stored by the CPU 26 as a .pdf file. All of these are stored pending distribution to the appropriate recipients in the appropriate form.

Once the notification file 32 is stored by the CPU 26, it is associated with the transmission data file 34 which is structured to include one or more of a number of data sets 36-44 that will later assist in controlling the transmission of the notification file 32. For example, the user 22 may insert information into the data sets 36-44 by entering key strokes (telephone key, computer key, etc.) in response to queries from the CPU as to what information should be entered in the data sets 36-44. The data sets 36-44 will then be associated with the notification file 32, as described. The information in the data sets 36-44 may be as follows: A time set 36 contains information relating to the time (e.g., date and time of day) the notification is scheduled for distribution. A recipient set 38 contains information relating to the class of recipients the notification is intended to reach. For example, the recipients may be all the parents of students at a school between 6th and 8th grades. A location set 40 contains information relating to the geographical locations the notification is intended to reach. For example, the intended recipients may be all the residents in a town living on one side of a river, or next to a combustible forest. Further data sets may be generated from information provided in preceding sets. For example, a number set 42 may be generated by the CPU 26 from the information entered into the recipient set 38, wherein the CPU 26 calculates the number of intended recipients of the notification, and enters that number into the number set 44 for later use, as described below. A sender identity set 44 may contain the identity of the user 22 who created the notification, and information relating to the status and rights of that user 22. The status and rights of the user 22 would be obtained based on the code entered by the user 22 to access the CPU 26 in order to leave the notification. For example, the user identity set 44 may indicate that the user 22 is the principal of a school who would legitimately want to reach a large audience of parents of students at the school. Alternatively, the user identity set 44 may indicate that the user is a teacher of 8th grade, who would typically want to reach only the parents of students in her 8th grade class, or perhaps all the 8th grade students in the school, but whose legitimate interest would not include communicating with the parents of all the students at a school. With particular relevance to the present invention, a class set (not shown) may be included to identify the class of notification. For example, a notification may be placed for mass transmission that notifies of an emergency, such as a shooting incident at a school, or a traffic incident on the way to school. Alternatively, a notification may be placed merely as an outreach communication to parents, with less urgency, or it may merely relate to attendance record of a particular group of students. Finally, a notification may be a "retry," one which was placed before but did not succeed in getting through. Such notifications may be given the lowest priority in a batch of notifications, because it has been found that a first retry typically also does not succeed in getting through. Information indicating the priority or urgency of the notification may also be included in at least one of these data sets.

As noted above, the notification 32 may be created in a plurality of formats (e.g., .wav, .txt, .html, or .pdf). For example, the notification 32 may be created in at least one format, based on whether the notification is received via interface 24 as a voice notification, an email, a website, or a facsimile. Once the notification 32 is created in the appropriate plurality of formats (e.g., .wav, .txt, or .pdf) and is associated with the transmission data file 34 with its data sets, the CPU 26 stores the notification and associated data file in a delivery interface 46. The delivery interface 46 is configured to hold the notification in storage 48 until a triggering event occurs, as more fully described below.

When such triggering event occurs, the delivery interface 46 causes the notification to be distributed, according to known methods, to a mass of recipients, e.g. recipients 60-66 of FIG. 1. Within the delivery interface 46 in the CPU, each recipient of the notification has already been associated with a means of transmission according to a prior request made by each potential recipient to the management of the system. Thus, for example, recipient 60 may have requested to be associated with a means of transmission by facsimile, recipient 62 may be associated with a means of transmission by voicemail, recipient 64 may be associated with a means of transmission by e-mail, recipient 66 may be associated with a means of transmission by text message, or pager, and so on. Thus, the CPU 26 is configured to transmit the notification in appropriate format (e.g. .wav, .txt, .pdf) to each recipient, according to a known method. In certain embodiments, a means of transmission may be associated with the recipient based on a selection made by the user 22. For example, a user may choose to associate a recipient with voicemail if the notification 32 is urgent. In certain embodiments, a means of transmission may be automatically associated with the recipient based on the content of the notification 32. For example, if the notification 32 includes an image, then means of transmission may be facsimile or email.

The result is that, once the triggering event occurs, a single notification (having been delivered to the CPU 26 by an enabled user 22 possessing an access code) is eventually transmitted to masses of recipients identified by the user 22. Such a single notification may be combined with numerous similar notifications (e.g., in a notification batch) for mass transmission at approximately the same time. This capability of the system places power in the hands of an institution or group of people to keep classes of citizens informed of events that are directly relevant to them on a real time basis.

In certain embodiments, the CPU 26 may store a request from a user 22 to store a notification in a database, instead of storing the notification in a local or remote memory associated with the CPU 26 as a notification file 32. In certain such embodiments, the notification may include an audio file in an appropriate format (e.g., .wav, .pcm, .mp3).

Considering now further aspects of the disclosed systems and methods, reference to an example of a type of problem that may be encountered will now be described. A first notification batch may include notifications to, for example, 10,000 recipients. Yet if a second notification batch is then immediately created and transmitted for sending to, for example, 100 recipients, the second notification batch may have to wait until all 10,000 of the first batch of notifications are sent. This is an undesirable situation, specifically where both batches have urgent and non-urgent notifications. Thus, there is a need for a solution so that at least priority recipients of the second batch can be promoted in the overall queue to be sent before some of the low priority notifications in the first batch are sent to designated recipients.

In another aspect of the type of problem which may be encountered, a pool or queue might contain 10,000 phone notifications which have been placed in a batch for transmission. Some of these notifications are of a higher priority than others. In addition, some of these notifications may have been placed, for example, in a queue or pool of notifications at 12:00 am while others were for example inserted into the queue at 12:15 am. In this particular instance, a problem is that the CPU may not assign a higher priority to urgent notifications in the third batch than non-urgent notifications in the second or first batches, so that at least some urgent notifications in the third batch may not receive priority over the low priority notifications in the first and second batches.

Accordingly, there is described herein systems and methods for mitigating this and other problems, with reference to a particular example that may be understood with reference to FIGS. 2-7. Some of the parameters for this example, such as the receipt of the first notification batch, should be recognized as exemplary only. In the method of this example, a first notification batch is determined, for example, at 12:00 a.m. In this regard, determining the first notification batch may correspond with receiving the first notification batch, or it may correspond with preparing the first notification batch based on plural notification requests which have been received. The first notification batch in this example is made up of different classes of notifications, being 100 Emergency Notifications, 100 Outreach Notifications, 100 Attendance Issue Notifications, and 100 Retry notifications that failed on a first attempt, totaling 400 notifications that must be transmitted as soon as possible. To place these 400 notifications in a linear sequence for transmission, the CPU 26 according to certain embodiments is configured to perform the following exercise, with reference to FIGS. 2-3. The CPU 26 first assigns each notification a Notification-ID (also referred to as Call-ID, as depicted in FIGS. 3 to 7) within the class of that notification. Thus, the CPU 26 assigns to all of the 100 Emergency notifications a "name," from Notification-ID1 sequentially through Notification-ID100. In a similar manner, the CPU 26 assigns to all of the notifications of the other classes (e.g., Outreach notifications, Attendance Issue notifications, and Retry notifications) a "name," from Notification-ID1 sequentially through Notification-ID100. The CPU 26 then assigns a low "weight increment" to the high priority Emergency Notifications, a higher "weight increment" to the less urgent Outreach Notifications, an even higher "weight increment" to the low priority Attendance Notifications, and a yet higher "weight increment" to the lowest priority Retry notifications—in short, the weight increment is inversely related to the importance of the notification class or type. This is exemplary only, as other weighting schemes may be used.

FIG. 3 is a chart illustrating the transmission of a plurality of notifications in a notification pool. In the example shown in FIG. 3, the weight increment for Emergency notifications is one, for Outreach notifications it is two, for Attendance Notifications it is four, and for Retry Notifications it is six, although other incremental weights may be chosen to reflect the needs of the management of the system. Starting then from Notification-ID1 (depicted Call-ID1 in FIG. 3), the CPU 26 assigns increasing "priority weights" to each Notification-ID in a class, increasing linearly by the "weight increment" from the first Notification-ID to the last. Thus, the 100 Emergency Notifications have Priority Weightings of 1 through 100, with increments of 1. Each of these Priority Weightings is depicted within a box in the example of FIG. 3. The 100 Outreach Notifications have Priority Weightings of 2 through 200, with increments of 2. The Attendance Notifications have Priority Weightings of 4 through 400, with increments of 4. The Retry Notifications have priority weightings of 6 through 600, with increments of 6. It will be appreciated that this step of assigning Notification identification numbers and Priority Weights to notifications in a batch is achievable in an instant, thereby minimizing delay.

When all the notifications in the batch have been assigned Notification-ID's and Priority Weightings, the CPU 26 commences transmitting the notifications in a serial sequence, following a method in which it selects for next transmission the Notification-ID having the lowest remaining Priority Weighting. For example, as shown in FIG. 3, the Emergency notification having Notification-ID2 (depicted as Call-ID2) will issue before the Attendance notification having Notification-ID1, since that Emergency notification has a Priority Weighting of 2, which is less than the Priority Weighting of 4 for that Attendance notification.

Where two or more notifications have the same Priority Weighting, the system merely selects the next one of them linearly, until all with the same weighting are transmitted, before moving on to the Notification-ID with the next lowest Priority Weighting. Thus, for example, with reference to FIG. 3, the CPU may reach a point where it has transmitted all notifications with a Priority Weighting of 20 and less.

FIG. 4 is a chart further illustrating the transmission of a plurality of notifications in a notification pool. FIG. 4 depicts the Priority Weightings remaining after all notifications with a Priority Weighting of 20 and less have been transmitted. It may be seen that the next notifications that will be transmitted under the above methodology will be the two Emergency Notifications with Priority Weightings of 21 (one of which is obtained by extrapolation from FIG. 3, and the other of which is from a new batch, as described below). As noted above, since these two notifications have the same Priority Weighting, the system merely selects the next one of them linearly, until both are transmitted. After these two notifications issue, the next notification to issue is the Outreach notification having a Priority Weighting of 22.

As shown in the example of FIG. 4, a second batch of notifications is directed to the CPU for transmission, for example, at 12:03 a.m. The second batch in this example consists of 10 Emergency Notifications. A problem encountered in conventional systems is that, if the second batch is simply placed behind the first batch in series, then 10 high priority emergency notifications will have to wait behind a large number of lower priority notifications, including 97 Retry Notifications which are of significantly lower priority. To address this problem, according to certain aspects of the disclosure, the new (second) notification batch may be blended into the older notification batch in the following manner to avoid undue delay of Emergency Notifications.

The new batch of Emergency Notifications is shown in the bottom line of FIG. 4. However, before Priority Weightings are assigned to the notifications of this new batch, an "aging" process may also be run. The purpose of the "aging" process is to ensure that if a second batch is determined (e.g., received or prepared by the CPU 26) a considerable time after the first batch, the priority notifications in the second batch are not given undue preference over less urgent notifications in the first batch, but that additional weighting is given to the second batch to take into account the fact that the first batch has a somewhat superior claim to transmission. Thus, a period is predetermined for an aging step, or age multiplier, indicated in FIG. 3. Further, a time lag may be calculated, the time lag being the difference in time between receipt of the first and second notification batches. In the case of the present example, the predetermined aging period is five minutes for Emergency Notifications. This means that if the time lag between the second (later) notification batch and the first notification batch is more than five minutes, a multiplier is applied to the incremental weight added to each notification of the second notification batch. However, in this case, the second notification batch is only three minutes after the first notification batch, so no "aging" takes place, no multiplier is applied, and the 12:03 am batch recorded in the bottom row of FIG. 4 starts its Notification-ID1 at the same minimum Priority Weighting of the lowest Emergency Notification-ID in the first batch, namely, 21—thereafter increasing in increments of one which is the same increment assigned to the Emergency notifications of the first batch. Once each notification in the second batch has been assigned a Priority Weighting and is added to the overall notification pool for transmission, the CPU 26 continues to select the next notification for transmission as the one with the lowest Priority Weighting. In this case, the two Emergency notifications from both first and second batches, each having Notification-ID1 and each having Priority Weighting 21 will be selected for transmission. As noted above, since these two notifications have the same Priority Weighting, the system merely selects the next one of them linearly, until both are transmitted. It will be appreciated that the steps described above may be carried out nearly instantaneously, so that no appreciable delay is experienced as the new (second) notification batch is blended into the existing (first) notification batch. In this way, the second notification batch is blended into the first notification batch in such a way that urgent notifications in the second batch are given some, but not total, priority over the non-urgent notifications in the first batch.

FIG. 5 is a chart further illustrating the transmission of a plurality of notifications in a notification pool. To develop the explanation of the above-mentioned aging process, assume for example that all notifications with Priority Weighting of 50 and less have been made by 12:15 a.m., at which time a third notification batch is determined (e.g., prepared or received). This third notification batch consists of 20 Attendance Notifications, as shown in FIG. 5. If the "aging" time period for Attendance notifications is pre-determined at 10 minutes, then this third notification batch must have its incremental weight multiplied by the multiplier pre-associated with this aging period, namely a multiplier of 2. Thus, referring to FIG. 5, the third notification batch is shown in the bottom line starting at Attendance Notification-ID1 having the same starting Priority Weight (54) as the lowest Priority Weight of the Attendance notifications in the first notification batch. However, whereas the weight increments for Attendance Notifications in the first batch are 4, the weight increments for Attendance Notifications in the third batch are 8, namely 4 multiplied by 2, wherein 2 is the multiplier pre-associated with the aging period of increments of 10 minutes for Attendance Notifications. Thus, having configured the selection matrix according to the principles set forth above, the CPU proceeds to transmit notifications in the pool from the Notification-ID with the lowest priority weight, as before.

FIG. 6 is a chart further illustrating the transmission of a plurality of notifications in a notification pool. In the example of FIG. 6, the contents of the pool at 12:17 a.m. are shown, when notifications with Priority Weight 400 and lower have been transmitted. It is seen that only Retry Notifications remain from the first batch, as these have been assigned the lowest urgency and therefore highest Priority Weight according to the above-described method.

FIG. 7 is a chart further illustrating the transmission of a plurality of notifications in a notification pool. As can be seen in FIG. 7, there is exemplified that a fourth notification batch is determined (e.g., prepared or received) at 12:17 a.m. consisting of 20 Attendance Notifications. These are added into the pool and commence with Priority Weight 406, the same as the lowest Priority Weight found in the pool at 12:17 a.m. In this example, no aging multiplier is applied, since no older Attendance Notifications remain in the pool. However, an aging multiplier could be applied in certain embodiments, since there are still other classes of notifications remaining in the pool. From these remaining notifications in the pool, the Notification-ID with the lowest priority weight is selected for next transmission, according to the method described above. In the manner thus described, the management of a notification sending system may configure the system to utilize an intelligent sequencing technique according to the methods set forth above as preferred methods of control.

Figure 2:
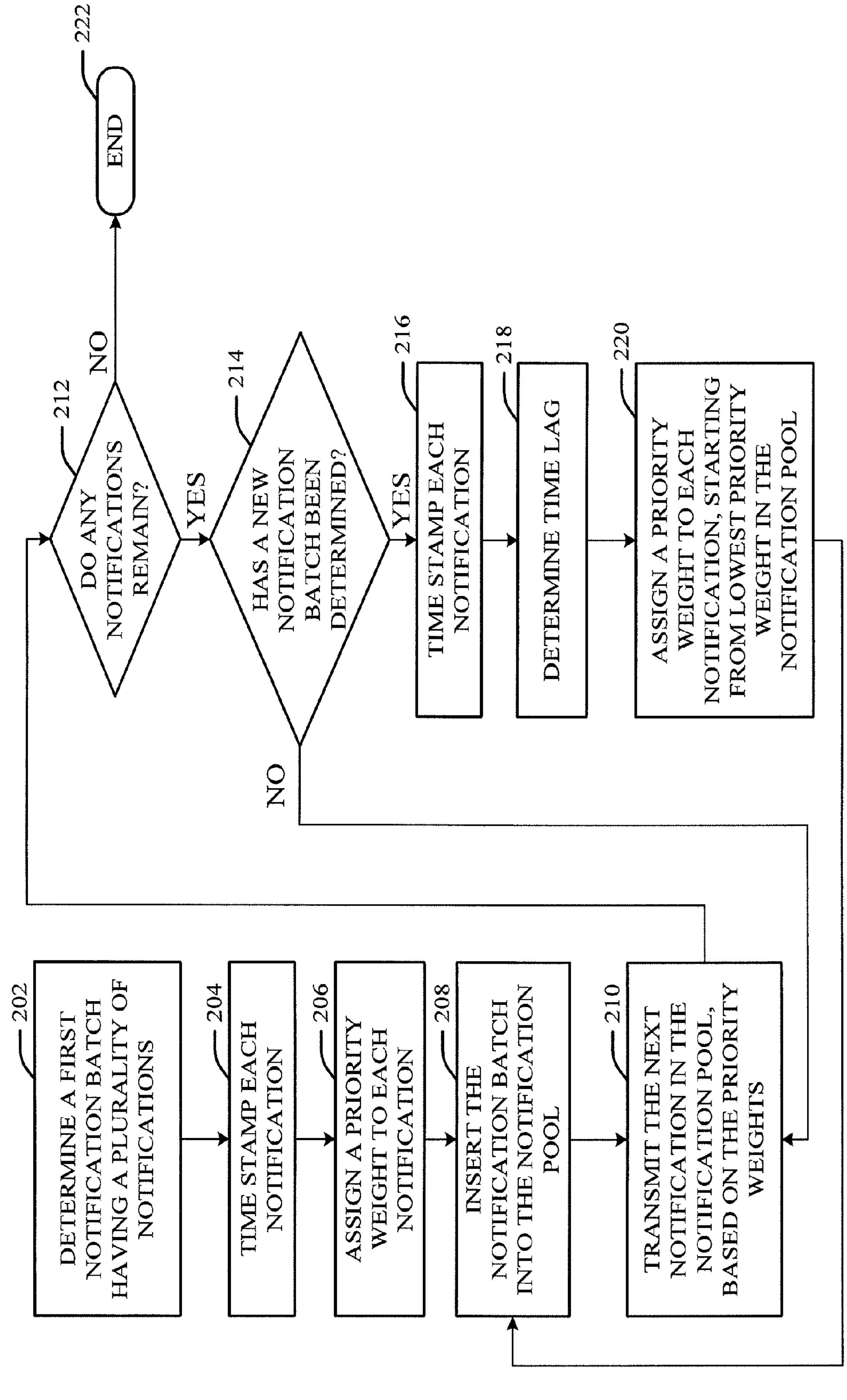
FIG. 2 is a flow chart illustrating an exemplary operation of transmitting a plurality of notifications in a notification pool.

Having set forth by example the process by which notification batches are processed into a pool for sequential transmission by a CPU, reference to FIG. 2 shows this method in general form. More specifically, FIG. 2 is a flow chart illustrating an exemplary operation of transmitting a plurality of notifications in a notification pool.

In step 202, a first notification batch having the plurality of notifications is determined (e.g., received or prepared) at a first time. This notification batch may include notifications of various classes (or types) such as Emergency notifications, Outreach notifications, Attendance notifications, Retry notifications, and the like. In step 204, each notification is time stamped with the first time. According to one aspect of the invention, the CPU waits for a notification batch to arrive, and when it arrives, each notification is time stamped with the current time. In step 206, a priority weight is assigned to each of the plurality of notifications, at least two of the priority weights being different. The CPU may assign, within a first class of notification, a priority weight that increases with each notification by a constant first increment. For example, where the importance of the notification is high, the incremental weight increase is low. The same is done for notifications in other notification classes, applying a different increment where the importance of the notification class is different. In step 208, the first notification batch is inserted into the notification pool. In step 210, the next notification in the notification pool is transmitted, based on the priority weights of the plurality of notifications. In other words, the plurality of notifications in the notification pool is transmitted in sequence based on the priority weights. According to one embodiment of the invention, the Notification-ID with the lowest priority weight is selected for next transmission.

Next, at decision step 212, an inquiry is made as to whether any notifications remain. If the answer to this inquiry is no, the process ends at step 222. Otherwise, at decision step 214, an inquiry is made as to whether a new notification batch having a plurality of notifications has been determined. If the answer to this inquiry is no, the process returns to step 210, in which the next notification in the notification pool is transmitted, based on the priority weights of the plurality of notifications.

If a new notification batch has been determined at decision step 214, each notification is time stamped with the time associated with the new notification batch, at step 216. In step 218, a time lag is determined for each notification, by subtracting the first time stamp from the new time stamp. In step 220, a priority weight is assigned to each of the plurality of notifications in the new notification batch, wherein a starting priority weight of the first notification of the new notification batch is preferably not less than the lowest priority weight of any notification in the notification pool.

The assigning the priority weight to each of the plurality of notifications may include assigning to each notification a priority weight that increases with each notification by a constant increment. The size of the increment may be based on a notification class associated with each notification and/or upon the time lag. For example, if a predetermined time threshold has been crossed in passing from the first time stamp to the second time stamp, an aging factor is multiplied by the increment that would ordinarily be applied to notifications of a single class.

Following step 220, the process returns to step 208, in which the new notification batch is inserted into the notification pool, with the other notifications in the pool. As noted above, the notification for next transmission is chosen based on priority weight. Preferably, the notification having the lowest priority weight in the pool is selected for next transmission. When all the notifications in the pool are transmitted, the process ends at step 222, and the CPU waits for the next batch of notifications to be determined (e.g., received or prepared), whereupon the process starts again from the beginning at step 202.

Figure 8:
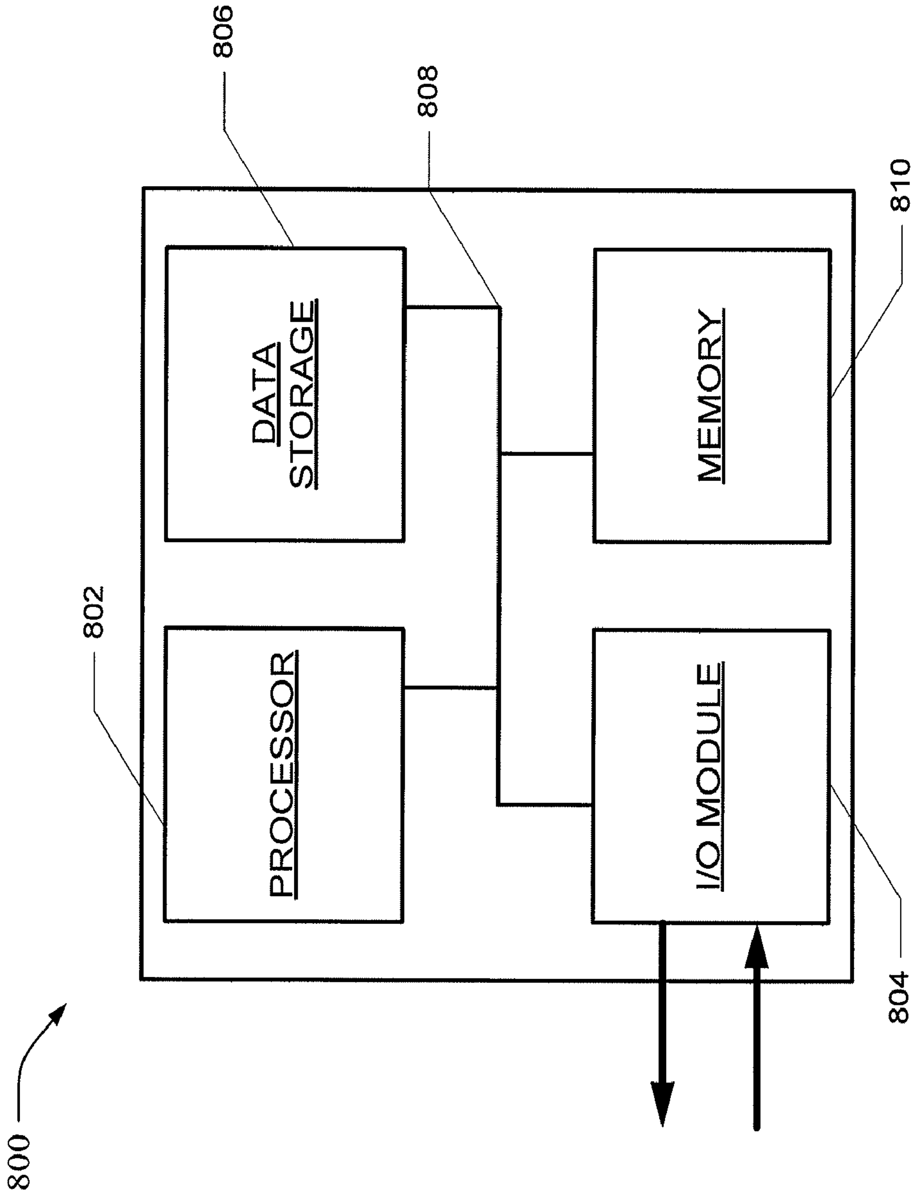
FIG. 8 is a block diagram illustrating an example of a computer system which may be used to transmit a plurality of notifications in a notification pool.

FIG. 8 is a block diagram that illustrates a computer system 800 which an embodiment of the present disclosure may be implemented in accordance with one aspect of the present disclosure. Computer system 800 includes a bus 808 or other communication mechanism for communicating information, and a processor 802 coupled with bus 808 for processing information. Computer system 800 also includes a memory 810, such as a random access memory ("RAM") or other dynamic storage device, coupled to bus 808 for storing information and instructions to be executed by processor 802. Memory 810 may also be used for storing temporary variable or other intermediate information during execution of instructions to be executed by processor 802. Computer system 800 further includes a data storage device 806, such as a magnetic disk or optical disk, coupled to bus 808 for storing information and instructions.

Computer system 800 may be coupled via I/O module 804 to a display device, such as a cathode ray tube ("CRT") or liquid crystal display ("LCD") for displaying information to a computer user. An input device, such as, for example, a keyboard, or a mouse may also be coupled to computer system 800 via I/O module 804 for communicating information and command selections to processor 802.

According to one aspect of the present disclosure, the transmission of a plurality of notifications in a notification pool may be implemented using a computer system 800 in response to processor 802 executing one or more sequences of one or more instructions contained in memory 810. Such instructions may be read into memory 810 from another machine-readable medium, such as data storage device 806. Execution of the sequences of instructions contained in main memory 810 causes processor 802 to perform the process steps described herein. One or more processors in a multi-processing arrangement may also be employed to execute the sequences of instructions contained in memory 810. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 806. Transmission media include coaxial cables, copper wire, and fiber optics, including the wires that comprise bus 808. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for transmitting a plurality of notifications in a notification pool, the method comprising:

determining a first notification batch having the plurality of notifications;

assigning a priority weight to each of the plurality of notifications based on a notification class associated with each of the plurality of notifications, at least two of the priority weights being different;

inserting the first notification batch into the notification pool; and transmitting the plurality of notifications in the notification pool sequentially, based on the priority weights of the plurality of notifications, wherein the priority weight for each of the plurality of notifications is assigned based on a predetermined pattern of increasing weights for the associated notification class.

2. The method of claim 1, wherein the assigning the priority weight for each of the plurality of notifications based on the predetermined pattern of increasing weights for the associated notification comprises:

assigning to each notification in a first notification class a priority weight that increases with each notification by a constant first increment; and assigning to each notification in a second notification class a priority weight that increases with each notification by a constant second increment different than the first increment.

3. The method of claim 1, wherein the determining the first notification batch occurs at a first time, and wherein the method further comprises time stamping each notification with the first time.

4. The method of claim 3, further comprising:

at a second time later than the first time, determining a second notification batch having a plurality of notifications;

assigning a priority weight to each of the plurality of notifications in the second notification batch according to the predetermined pattern for the notification class of each of the notifications in the second notification batch, wherein a starting priority weight of the first notification of the second notification batch is not less than the lowest priority weight of any notification in the notification pool; and inserting the second notification batch into the notification pool for transmission with the other notifications in the notification pool.

5. The method of claim 4, wherein the assigning the priority weight to each of the plurality of notifications in the second notification batch according to the predetermined pattern for the notification class of each of the notifications in the second notification batch comprises assigning to each notification in the second notification batch a priority weight that increases with each notification by a predetermined increment according to the predetermined pattern for the notification class of the notifications.

6. The method of claim 5, further comprising:

time stamping each notification in the second notification batch with the second time.

7. The method of claim 6, further comprising:

subtracting the first time stamp from the second time stamp to obtain a time lag between the first and second notification batches, wherein the size of the predetermined increment is further based at least in part upon the time lag.

8. The method of claim 1, wherein the notification class is one of an emergency class, an outreach class, an attendance class and a retry class, the retry class corresponding to a notification attempt which was previously unsuccessful.

9. The method of claim 1, wherein the transmitting the plurality of notifications in the notification pool sequentially comprises selecting for next transmission the notification in the notification pool with the lowest priority weight.

10. The method of claim 1, wherein each of the plurality of notifications is at least one of an email notification, a telephone notification, a cellular phone notification, a facsimile notification, a text message and a pager notification.

11. The method of claim 1, wherein the determining the first notification batch comprises preparing the first notification batch.

12. The method of claim 1, wherein the determining the first notification batch comprises receiving the first notification batch.

13. A system for transmitting a plurality of notifications, the system comprising a processor configured to:

determine a first notification batch having the plurality of notifications;

assign a priority weight to each of the plurality of notifications based on a notification class associated with each of the plurality of notifications, at least two of the priority weights being different;

insert the first notification batch into the notification pool; and transmit the plurality of notifications in the notification pool sequentially, by selecting for next transmission the notification in the notification pool with the lowest priority weight, wherein the priority weight for each of the plurality of notifications is assigned based on a predetermined pattern of increasing weights for the associated notification class.

14. The system of claim 13, wherein the processor is configured to assign the priority weight for each of the plurality of notifications based on the predetermined pattern of increasing weights for the associated notification by:

assigning to each notification in a first notification class a priority weight that increases with each notification by a constant first increment; and assigning to each notification in a second notification class a priority weight that increases with each notification by a constant second increment different than the first increment.

15. The system of claim 13, wherein the processor is configured to determine the first notification batch at a first time, and wherein the processor is further configured to time stamp each notification with the first time.

16. The system of claim 15, wherein the processor is further configured to:

at a second time later than the first time, determine a second notification batch having a plurality of notifications;

assign a priority weight to each of the plurality of notifications in the second notification batch according to the predetermined pattern for the notification class of each of the notifications in the second notification batch, wherein a starting priority weight of the first notification of the second notification batch is not less than the lowest priority weight of any notification in the notification pool; and insert the second notification batch into the notification pool for transmission with the other notifications in the notification pool.

17. A non-transitory machine-readable medium encoded with instructions for transmitting a plurality of notifications, the instructions comprising code for:

determining a first notification batch having the plurality of notifications;

assigning a priority weight to each of the plurality of notifications based on a notification class associated with each of the plurality of notifications, at least two of the priority weights being different;

inserting the first notification batch into the notification pool; and transmitting the plurality of notifications in the notification pool sequentially, by selecting for next transmission the notification in the notification pool with the lowest priority weight, wherein the priority weight for each of the plurality of notifications is assigned based on a predetermined pattern of increasing weights for the associated notification class.

18. A method for transmitting a set of notifications in a notification pool, the method comprising:

determining a first notification batch having at least one notification;

assigning a priority weight to each of the notifications in the first notification batch based on a notification class associated with each of the notifications;

inserting the first notification batch into the notification pool; and transmitting the notifications in the notification pool sequentially, based on the priority weights of the notifications, wherein the priority weight for each of the notifications is assigned based on a predetermined pattern of increasing weights for the associated notification class.

19. The method of claim 18, wherein the first notification batch comprises a plurality of notifications, and wherein at least two of the priority weights assigned to each of the notifications in the first notification batch are different.

* * * * *